(12) United States Patent
Marien et al.

(10) Patent No.: US 10,619,232 B2
(45) Date of Patent: Apr. 14, 2020

(54) CONNECTING ELEMENT, IN PARTICULAR SCREW OR NUT

(71) Applicant: Isabellenhuette Heusler GmbH & Co. KG, Dillenburg (DE)

(72) Inventors: Jan Marien, Herborn (DE); Jens Hartmann, Eschenburg (DE); Daniel Zuckermann, Herborn (DE)

(73) Assignee: Isabellenhuette Heusler GmbH & Co. KG, Dillenburg (DE)

( * ) Notice: Subject to any disclaimer, the term of this patent is extended or adjusted under 35 U.S.C. 154(b) by 198 days.

(21) Appl. No.: 15/547,371

(22) PCT Filed: Jan. 29, 2016

(86) PCT No.: PCT/EP2016/000155
§ 371 (c)(1),
(2) Date: Jul. 28, 2017

(87) PCT Pub. No.: WO2016/124322
PCT Pub. Date: Aug. 11, 2016

(65) Prior Publication Data
US 2018/0023175 A1    Jan. 25, 2018

(30) Foreign Application Priority Data

Feb. 2, 2015   (DE) .................. 10 2015 001 293

(51) Int. Cl.
*H01R 11/28* (2006.01)
*C22F 1/08* (2006.01)
(Continued)

(52) U.S. Cl.
CPC .................. *C22F 1/08* (2013.01); *C22C 9/00* (2013.01); *C22C 9/06* (2013.01); *F16B 15/0092* (2013.01);
(Continued)

(58) Field of Classification Search
CPC ...... H01M 2/32; H01R 11/284; H01R 11/281; H01R 11/283; H01R 11/285; H01R 43/00; H01L 21/76813
See application file for complete search history.

(56) References Cited

U.S. PATENT DOCUMENTS 3,279,039 A    10/1966    Nippert
7,648,601 B2    1/2010    Hasegawa et al.
(Continued)

FOREIGN PATENT DOCUMENTS

CN    102888525 A    1/2013
DE    1458546 B1    4/1970
(Continued)

OTHER PUBLICATIONS

English Abstract for CN 102888525 A (2013).
(Continued)

*Primary Examiner* — Xuong M Chung Trans
(74) *Attorney, Agent, or Firm* — Caesar Rivise, PC

(57) ABSTRACT

The invention relates to a connecting element (4, 5), in particular a screw (4) or a nut (5), for mechanically connecting components (1, 2), the connecting element (4, 5) consisting at least partially of a material with a mechanical tensile strength of at least 350 MPa. According to the invention, the material of the connecting element (4, 4', 5, 8) has an electrical conductivity of at least 50% IACS. The invention also relates to a corresponding production method for a connecting element (4, 5) of this type.

31 Claims, 6 Drawing Sheets

(51) Int. Cl.
*C22C 9/00* (2006.01)
*C22C 9/06* (2006.01)
*F16B 15/00* (2006.01)
*F16B 19/04* (2006.01)
*F16B 33/00* (2006.01)
*H02G 5/00* (2006.01)

(52) U.S. Cl.
CPC .............. *F16B 19/04* (2013.01); *F16B 33/00* (2013.01); *F16B 2019/045* (2013.01); *H02G 5/00* (2013.01)

(56) References Cited

U.S. PATENT DOCUMENTS

| | | | |
|---|---|---|---|
| 9,512,506 B2 | 12/2016 | Oishi et al. | |
| 9,845,521 B2 * | 12/2017 | Shishido | ................... C22C 1/02 |
| 2001/0051105 A1 | 12/2001 | Miyoshi et al. | |
| 2003/0121573 A1 | 7/2003 | Miyoshi et al. | |
| 2005/0028907 A1 | 2/2005 | Hasegawa et al. | |
| 2010/0269959 A1 * | 10/2010 | Gao | ........................... C22C 9/00 |
| | | | 148/554 |
| 2011/0073221 A1 * | 3/2011 | Kaneko | ..................... C22C 9/06 |
| | | | 148/554 |
| 2011/0240180 A1 * | 10/2011 | Gao | ........................... C22C 9/06 |
| | | | 148/554 |

FOREIGN PATENT DOCUMENTS

| | | |
|---|---|---|
| DE | 10392428 T5 | 6/2005 |
| DE | 102005059561 A1 | 6/2007 |
| EP | 2557187 A1 | 2/2013 |
| EP | 2752498 A1 | 7/2014 |
| JP | 6-290639 A | 10/1994 |
| JP | 2001-316741 A | 11/2001 |
| JP | 2009-242926 A | 10/2009 |
| WO | 2009107586 A1 | 9/2009 |

OTHER PUBLICATIONS

Xin et al. (2000).Niobium. Science and Technology, CITIC-CBMM Microalloying Technology Center, Metallurgical Industry Press, p. 726.
She. (2012). New handbook of common metal materials in China and foreign countries. Shanxi Institute of Standardization, Shanxi Science and Technology Press, p. 961.
English language abstract for DE 102005059561 A1 (2007).
International Search Report from corresponding PCT/EP2016/000155 dated Jun. 29, 2016.
English-language Abstract for JPH06290639A (1994).
English-language Abstract for JP2001316741A (2001).
English-language Abstract for JP2009242926A (2009).

* cited by examiner

CONNECTING ELEMENT, IN PARTICULAR SCREW OR NUT

CROSS-REFERENCE TO RELATED APPLICATIONS

This application is a U.S. National Phase Application of PCT/EP2016/000155, filed Jan. 29, 2016, which claims priority to DE 10 2015 001 293.2, filed Feb. 2, 2015, the contents of which applications are incorporated herein by reference in their entireties for all purposes.

BACKGROUND OF THE INVENTION

The invention relates to a connecting element, in particular a screw or a nut, for mechanically connecting components.

Conductor-bar arrangements in which two current-conducting conductor bars of highly conductive copper are connected together by a screw in order to produce an electrical and mechanical connection between the two conductor bars are known from the prior art (e.g. DE 10 2005 059 561 A1). The two conductor bars in this case lie on one another in plane-parallel manner in the region of the screw connection, which results in a low electrical transfer resistance between the two conductor bars. However, the transfer resistance between the two conductor bars is not zero: this can be ascribed in particular to the surface roughness of the conductor bars and to any soiling of the surfaces of the conductor bars which lie on one another. What is disadvantageous about the known conductor-bar arrangements is therefore the electrical transfer resistance between the conductor bars which are connected together.

A high-strength conductive copper alloy wire which can be used for example as a battery pole or as an electric cable is known from DE 103 92 428 T5. In this case it is therefore not a connecting element in the sense according to the invention.

Furthermore, DE-AS 1 458 546 discloses a semiconductor mount, which as such is non-generic.

It is therefore an object of the invention to reduce the transfer resistance in such a conductor-bar arrangement.

This object is achieved by a connecting element according to the invention (e.g. screw, nut).

BRIEF SUMMARY OF THE INVENTION

The invention is based on the technical-physical finding that in a conductor-bar arrangement part of the electric current flows through the connecting element (e.g. screw, nut), so the connecting element should form as low a resistance as possible.

The invention therefore comprises the technical teaching of producing the connecting element (e.g. screw or nut) in such a conductor-bar arrangement from a material which not only has a sufficient mechanical tensile strength but also has a very high electrical conductivity, in order to be able to realize as low as possible an electrical transfer resistance between two conductor bars. These target requirements are however unfortunately to some extent contradictory, since a high mechanical tensile strength cannot usually be combined with very high electrical conductivity. Thus copper, for example, has a very high electrical conductivity but only a relatively low mechanical tensile strength, so for example screws are not manufactured from copper. The invention however resolves these conflicting aims by using a suitable material for the connecting element, as will be described in detail later.

Below, however, first of all the material properties of the material of the connecting element according to the invention will be described.

Thus the material of the connecting element preferably has a mechanical tensile strength of at least 350 MPa, 400 MPa, 450 MPa, 500 MPa, 550 MPa or even at least 600 MPa, which is usually adequate for producing mechanical screw connections.

The electrical conductivity of the material of the connecting element—measured on the IACS scale (IACS: International Annealed Copper Standard)—on the other hand is at least 50% IACS, 60% IACS, 70% IACS, 80% IACS or even at least 90% IACS. An IACS value of 100% in this case corresponds to the electrical conductivity of copper.

Furthermore, the material of the connecting element preferably has a yield strength of at least 100 MPa, 200 MPa, 300 MPa, 400 MPa, 500 MPa or 600 MPa.

The elongation at break of the material of the connecting element on the other hand is preferably at least 1%, 2%, 5%, 10% or even at least 20%.

The connecting element thus preferably belongs to strength class 4.6, 6.8 or 8.8. The first digit in this case, multiplied by 100, indicates the mechanical tensile strength in $N/mm^2$, while the product of the two digits multiplied by 100 defines the mechanical yield strength in $N/mm^2$. Strength class 8.8 therefore defines a tensile strength of $8 \times 100$ $N/mm^2$ and a yield strength of $8 \times 8 \times 100$ $N/mm^2$.

The combination according to the invention of high mechanical tensile strength on one hand with very high electrical conductivity on the other hand can be realized by various alloys according to the invention which will be described below.

Thus the material of the connecting element may for example be a copper/chromium alloy, in particular with a mass percentage of chromium of 0.2%-1%, 0.3%-0.8% or 0.4%-0.6%. To increase the mechanical strength, the copper/chromium alloy may additionally contain a mass percentage of up to 0.2% of silver, magnesium, hafnium, titanium, zirconium and/or tin.

Alternatively, there is however also the possibility that the material of the connecting element according to the invention is a copper/magnesium alloy, in particular with a mass percentage of magnesium of 0.1%-0.5%.

A further possible material for the connecting element according to the invention is a copper/niobium alloy, in particular as a composite material with a copper sheath which supplies the necessary high electrical conductivity.

A further example of embodiment on the other hand provides a copper/nickel/silicon alloy, such as for example $CuNi_3Si$, as material for the connecting element.

Generally it should be mentioned that the connecting element according to the invention may have an outer covering of copper in order to furnish the desired high electrical conductivity.

It has already been mentioned above that the connecting element may be a screw or a nut. The invention is however not limited to these types of connecting elements, but can also be realized with other types of connecting elements, such as for example rivets, bolts, pins and nails, to name only a few examples.

Further, it should be mentioned that the invention is not limited to the use of the connecting element according to the invention for connecting conductor bars. Rather, the invention also generally claims protection for the connecting element according to the invention for other intended purposes.

In the case of a screw, it should be taken into account that conductor bars made of copper usually have a tensile strength of merely 220 MPa for a yield strength of 70 MPa. Here the screw connection would be designed to be beyond the elastic limit. In order to be able to utilize the strength of the screw as a higher pretensioning force, it is expected that screws with an enlarged screw head will have to be produced. The screw according to the invention therefore preferably has a screw head with a formed-on disc, it being possible to form on a disc in the case of a nut as well. In this case, the formed-on disc preferably permits an increase in the contact surface by at least 50% or 75%, 100% or even 150%.

Furthermore, it should be mentioned that the invention does not only claim protection for the connecting element according to the invention described above (e.g. screw). Rather, the invention also claims protection for a current conductor arrangement (e.g. conductor-bar arrangement) with a plurality of current-conducting components (e.g. conductor bars), which are connected together electrically and mechanically by a connecting element according to the invention (e.g. screw).

The current-conducting components may however for example also be a cable lug, an automotive body sheet, a hull, a resistor (e.g. low-resistance shunt) or a mass point on a housing part.

Furthermore, the invention also claims protection for a corresponding production method for producing such a connecting element which on one hand is mechanically sufficiently loadable and on the other hand is electrically highly conductive.

In one variant of the invention, the production method provides that first of all a rolled wire is produced which consists for example of a copper/chromium alloy. Then solution heat treatment of the rolled wire subsequently takes place in order to achieve the desired tensile strength. Finally, the rolled wire is then drawn to its specified nominal diameter.

After the solution heat treatment of the rolled wire and prior to the drawing of the rolled wire, in an additional step provision may additionally be made for an oxide layer on the rolled wire to be removed, in particular in a shaving line. In this case, the oxide layer on the wire is mechanically shaved off the wire with an annular, sharp tool, the internal diameter of which is less than the external diameter of the wire.

To produce the rolled wire, preferably first of all the material (e.g. copper/chromium alloy) is melted in a vacuum furnace and then hot-rolled to produce the rolled wire.

The solution heat treatment of the rolled wire mentioned above on the other hand preferably comprises first of all heating of the rolled wire and then quenching of the rolled wire, in particular in water. The heating of the rolled wire in the solution heat treatment takes place preferably for a duration of 5-15 minutes, 7-13 minutes or 9-11 minutes at a temperature of +800-1200° C., +900-1100° C. or +950-1050° C.

Furthermore, with this variant of the invention provision may additionally be made for the rolled wire to be precipitation-hardened, for example at a temperature of +300-600° C., +350-550° C. or +400-500° C. for a period of 4-16 hours, 6-14 hours or 6-10 hours. Then subsequently the connecting elements according to the invention can be formed from the precipitation-hardened rolled wire, which can take place in conventional manner.

The above mentioned precipitation hardening of the rolled wire may take place after the solution heat treatment and after the removal of the oxide layer.

However, alternatively there is also the possibility of the precipitation hardening of the rolled wire taking place after the solution heat treatment and prior to the removal of the oxide layer.

In a modification of this variant, the connecting elements are formed from the rolled wire prior to the precipitation hardening. Then the formed connecting elements are subsequently precipitation-hardened as piece goods, for example at a temperature of +300-600° C., +350-550° C. or +400-500° C. for a period of 4-16 hours, 6-14 hours or 6-10 hours.

Another variant of the invention on the other hand provides for the connecting element to be produced from a copper/magnesium alloy, for example with a mass percentage of magnesium of 0.1%-0.5%. As a result, solid-solution hardening of the copper/magnesium alloy then takes place. In this case, the crystal lattice is strained owing to the differing lattice constants of the various alloying constituents. This straining of the crystal lattice hinders the dislocation motion which represents the basis for the deformability of metallic materials. As a consequence, the mechanical strength of the alloy increases. After the solid-solution hardening of the copper/magnesium alloy, cold forming can then take place in order to produce the connecting elements.

In the case of the copper/magnesium alloy, solid-solution hardening is achieved due to the alloying of the magnesium to the copper. Now the material is cold-hardened by cold forming of the shaved rolled wire. Upon the cold-hardening, dislocations, i.e. lattice defects, are introduced into the crystal lattice of the material by deformation below the recovery or recrystallization temperature. As a result, the dislocation motion in the material is hindered, which results in an increase in the strength of the material.

In another variant of the invention, on the other hand, a composite material consisting of a copper/niobium alloy with a copper sheath is made available, the copper/niobium alloy preferably containing a mass percentage of niobium of 5%-30%, 10%-25% or 15%-20%. Then the composite material is subsequently drawn. In a further step, the connecting elements are then formed from the drawn composite material.

BRIEF DESCRIPTION OF THE DRAWINGS

Other advantageous developments of the invention will be explained in greater detail below with reference to the figures together with the description of the preferred examples of embodiment of the invention. Therein.

DETAILED DESCRIPTION OF PREFERRED EMBODIMENTS

Figure 1:
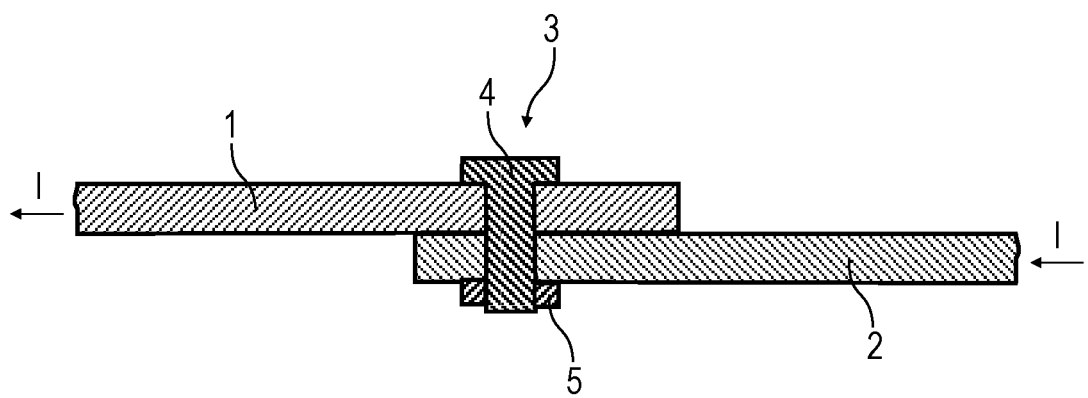
FIG. 1 is a schematic cross-sectional view through a conductor-bar arrangement according to the invention.

FIG. 1 shows a schematic representation of a conductor-bar arrangement according to the invention with two conductor bars 1, 2 made of copper, the two conductor bars 1, 2 lying with their free ends in plan-parallel manner one on another and being electrically and mechanically connected together by a screw connection 3.

The screw connection 3 in this case consists of a screw 4 according to the invention with a correspondingly adapted nut 5.

The screw 4 and the nut 5 in this case consist of a special material which combines a high mechanical tensile strength of at least 350 MPa with a high electrical conductivity of at least 50% IACS. With regard to the concrete composition of the material of the screw 4 and the nut 5, there are various possibilities, some variants of which will be described in detail below.

Figure 2:
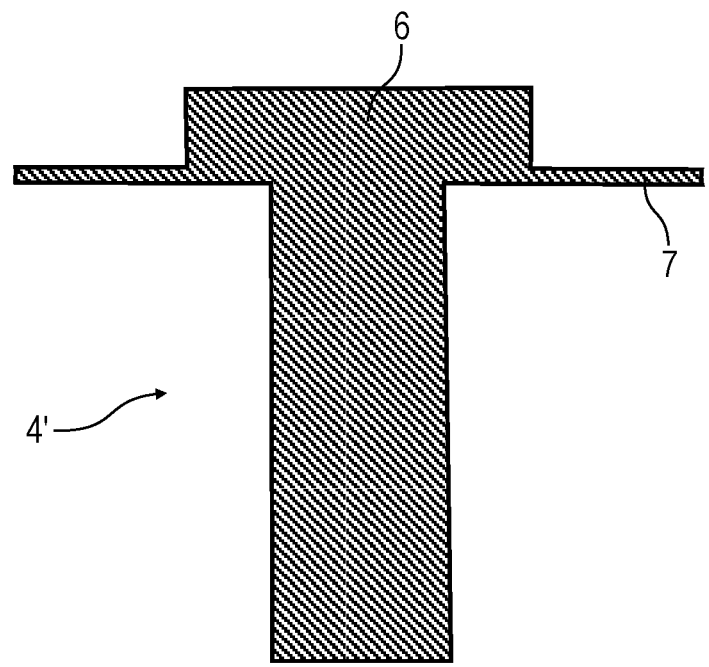
FIG. 2 is a schematic cross-sectional view of a screw according to the invention with a formed-on disc.

FIG. 2 shows a modification of a screw 4' with a screw head 6 with a formed-on disc 7, the disc 7 increasing the contact surface of the screw head 6 by more than 100%. This is advantageous in particular when—as in FIG. 1—relatively soft components made of copper are to be connected together.

Figure 3:
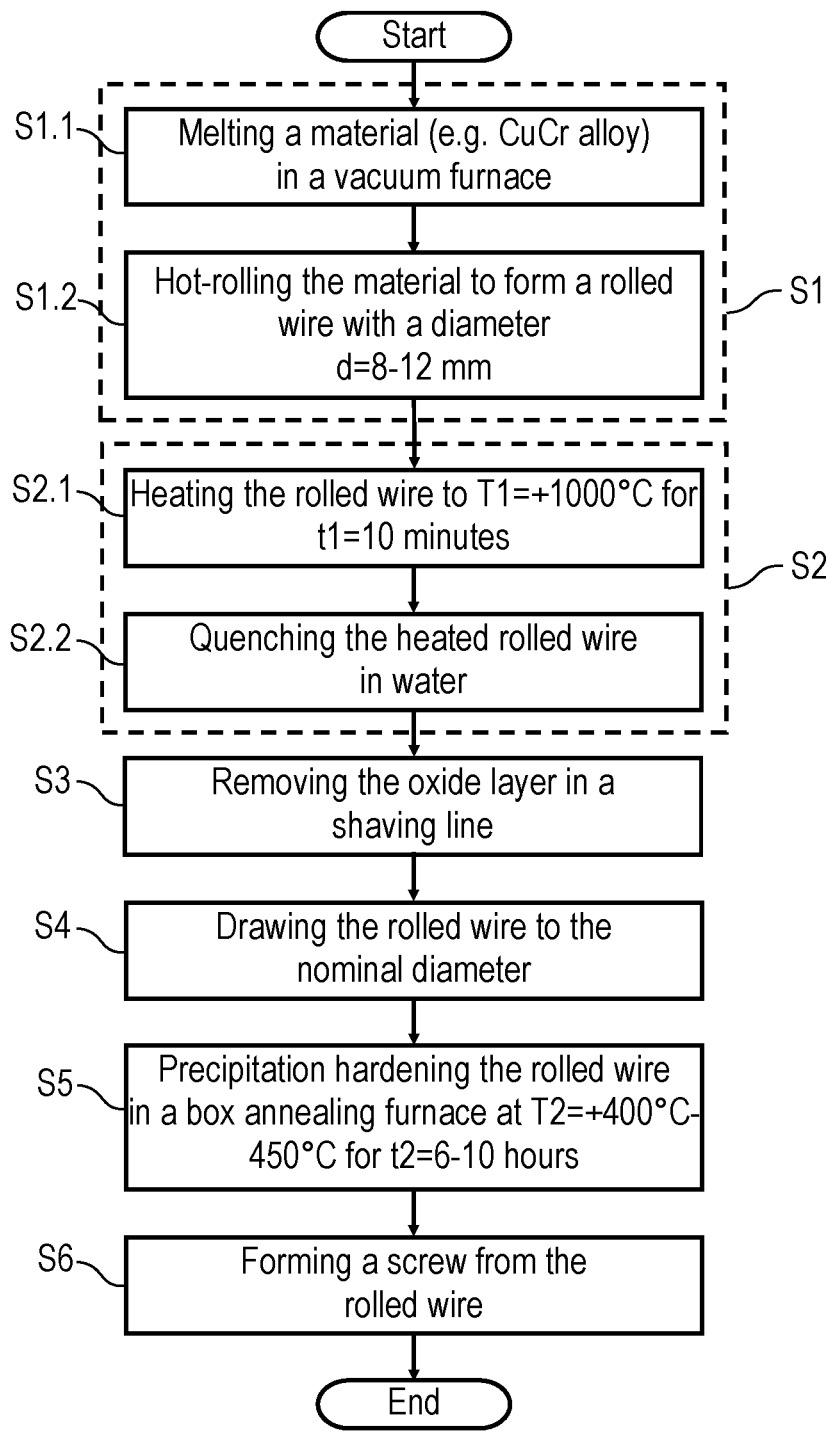
FIG. 3 is a variant of the production method according to the invention as a flow chart with a copper/chromium alloy as starting material.

Below, now first of all the flow chart in FIG. 3 is described, which describes a first variant for producing the material for the connecting element according to the invention.

In a first step S1, first of all a rolled wire is produced.

To this end, first of all in a step S1.1 a suitable material (e.g. a copper/chromium alloy) is melted in a vacuum furnace. Then the material is subsequently rolled in a step S1.2 to produce the desired rolled wire with a diameter of d=8-12 mm.

In a subsequent step S2, solution heat treatment of the rolled wire then takes place. In the context of the solution heat treatment, the rolled wire is first of all heated to a temperature of T1=+1000° C. in a step S2.1 for a period t1=10 minutes. Then the heated rolled wire is subsequently quenched in water in a step S2.2.

In a further step S3, then the oxide layer on the rolled wire is removed in a shaving line. In this case, the oxide layer on the rolled wire is mechanically shaved off the wire with an annular, sharp tool, the internal diameter of the tool being less than the external diameter of the rolled wire.

In a step S4, the rolled wire is then drawn to the desired nominal diameter in conventional manner.

Subsequently, in a step S5 precipitation hardening of the rolled wire in a box annealing furnace takes place at a temperature of T2=+400-450° C. for a period t2=6-10 hours.

After these steps, the material has then attained a tensile strength of around 400 MPa, an elongation at break of 10% and an electrical conductivity of more than 85% IACS.

In a further step S6, a screw is then formed from the rolled wire.

Figure 4:
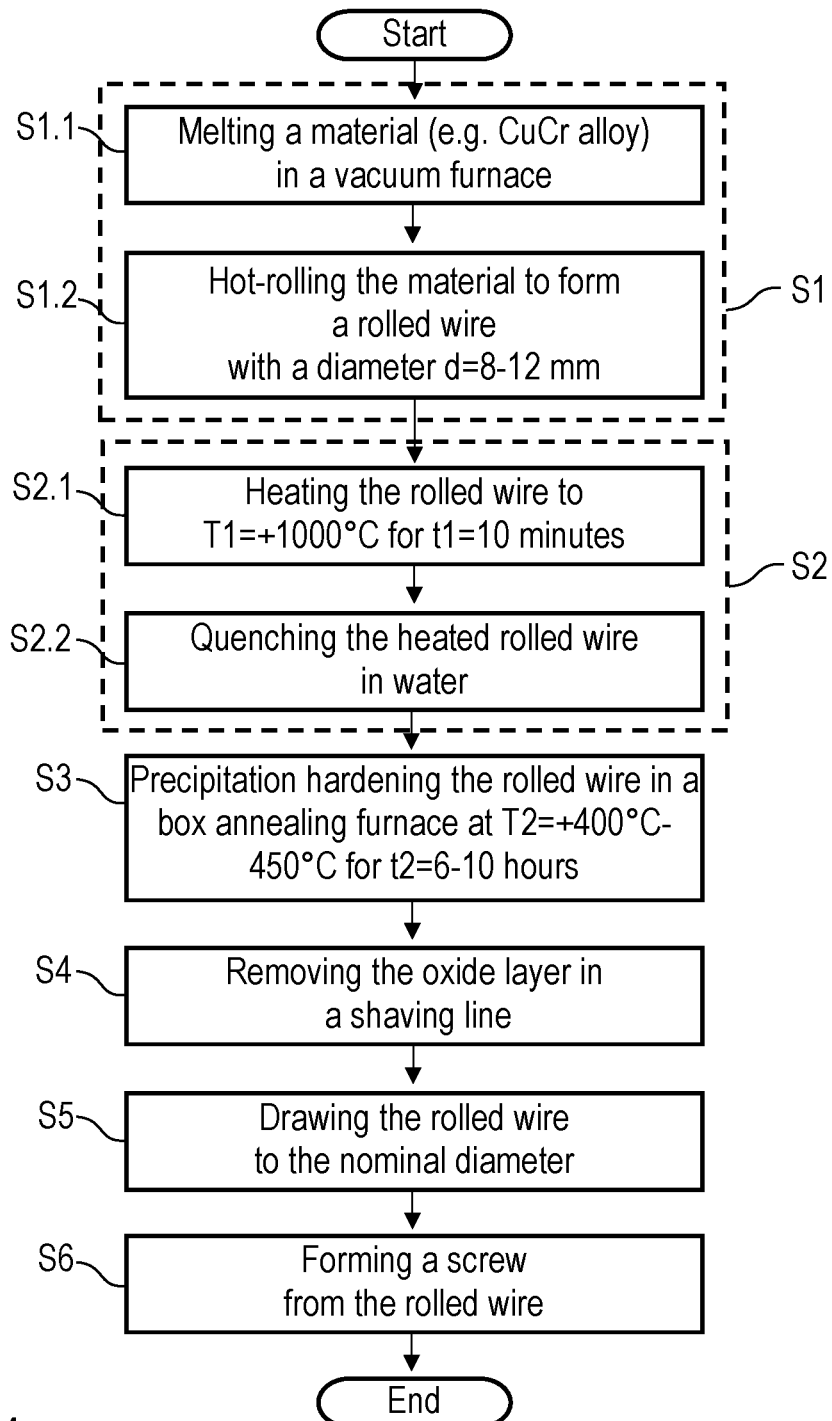
FIG. 4 is a modification of FIG. 3.

The example of embodiment according to FIG. 4 largely corresponds to the example of embodiment described above and illustrated in FIG. 3, so reference is made to the above description of FIG. 3 in order to avoid repetition.

One distinctive feature of this example of embodiment consists in that the precipitation hardening of the rolled wire is moved from step S5 in FIG. 3 into step S3 in FIG. 4. The precipitation hardening of the rolled wire in this case therefore takes place chronologically prior to the removal of the oxide layer in a shaving line and also prior to the drawing of the rolled wire.

Figure 5:
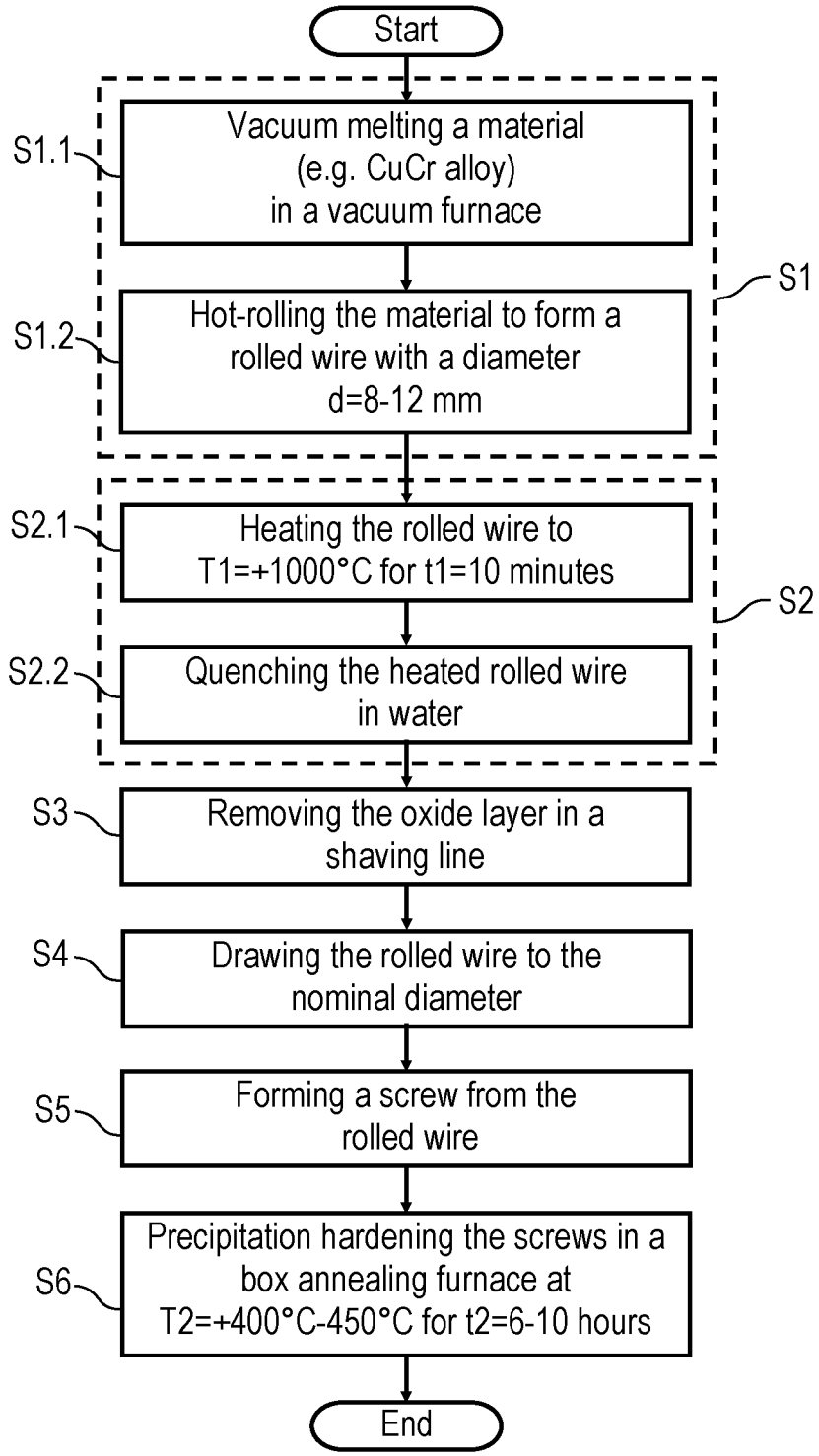
FIG. 5 is a further modification of FIG. 3.

The example of embodiment according to FIG. 5 likewise largely corresponds to the example of embodiment according to FIG. 3, so reference is made to the above description of FIG. 3 in order to avoid repetition.

One distinctive feature of this example of embodiment consists in switching steps S5 and S6 in FIG. 3. This means that first of all in a step S5 the individual screws are formed from the rolled wire and subsequently then the formed screws are precipitation-hardened as piece goods in a step S6.

Figure 6:
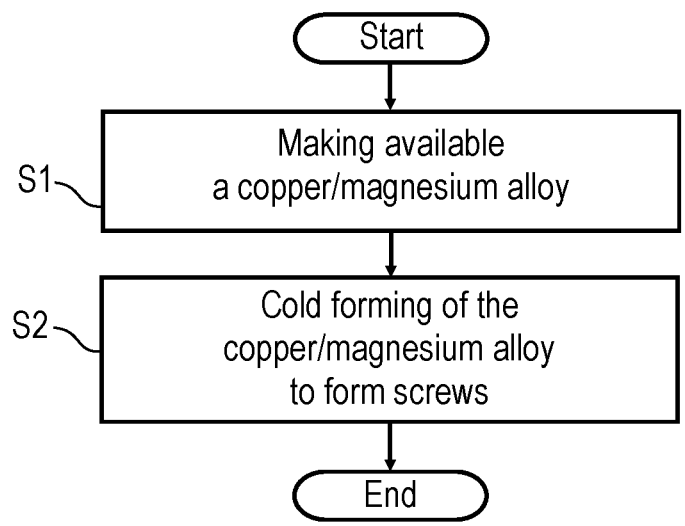
FIG. 6 is another variant of the invention with a copper/magnesium alloy as starting material.

The example of embodiment according to FIG. 6 will now be described below.

In this case, first of all in a step S1 a copper/magnesium alloy is made available. Solid-solution hardening is achieved by the alloying. Thereupon, screws are then produced from the hardened copper/magnesium alloy by cold forming in a step S2.

Figure 7A:
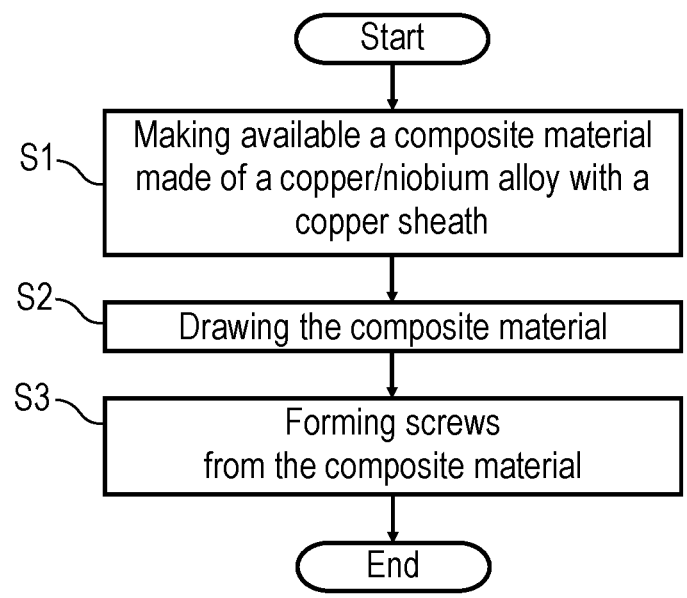
FIG. 7A is a further variant of a production method according to the invention with a copper/niobium alloy as starting material.

Below, the example of embodiment according to FIG. 7A will now be described with reference to FIGS. 7A and 7B.

In this case, first of all in a step S1 a composite material consisting of a copper/niobium alloy with a copper sheath is made available.

Figure 7B:
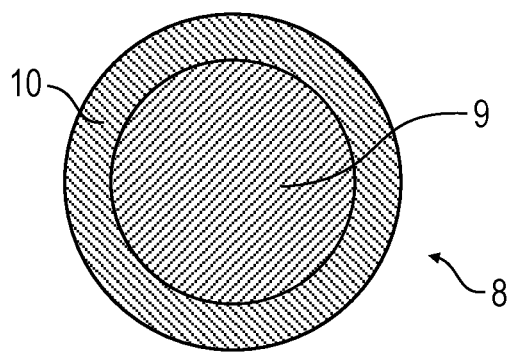
FIG. 7B is a schematic cross-sectional view through a connecting element produced according to the invention.

FIG. 7B shows a schematic cross-sectional view through a screw 8 with a core 9 of the copper/niobium alloy and a sheath 10 of copper, the sheath 10 of copper providing the desired electrical conductivity.

In a step S2, the composite material is then drawn, and in a step S3 screws are formed therefrom.

The invention is not limited to the preferred examples of embodiment described above. Rather, a large number of variants and modifications are possible which likewise make use of the inventive concept and therefore fall within the extent of protection. In particular, the invention also claims protection for the subject-matter and the features of the dependent claims independently of the claims referred to.

List of Reference Numerals:
1 conductor bar
2 conductor bar
3 screw connection
4 screw
4' screw
5 nut
6 screw head
7 disc
8 screw
9 core of screw 8
10 sheath of screw 8

The invention claimed is:

1. A connecting element for mechanically connecting components, wherein the connecting element comprises a material with a mechanical tensile strength of at least 350 MPa, wherein the material of the connecting element is a copper/chromium alloy having a mass percentage of chromium of 0.2%-1% and an electrical conductivity of at least 50% IACS, and the connecting element is one of a nut, a rivet and a bolt.

2. The connecting element according to claim 1, wherein
   a) the mechanical tensile strength of the material of the connecting element is at least 400 MPa, and
   b) the electrical conductivity of the material of the connecting element is at least 60% IACS.

3. The connecting element according to claim 2, wherein
   c) the material of the connecting element has a yield strength of at least 100 MPa, and d) the material of the connecting element has an elongation at break of at least 1%.

4. The connecting element according to claim 1, having a mass percentage of up to 0.2% of at least one of the following materials; silver, magnesium, hafnium, titanium, zirconium and tin.

5. The connecting element according to claim 3, wherein the material of the connecting element is a copper/magnesium alloy.

6. The connecting element according to claim 5 having a mass percentage of magnesium of 0.1%-0.5%.

7. The connecting element according to claim 3, wherein the material of the connecting element is a copper/niobium alloy.

8. The connecting element according to claim 7 with a copper sheath.

9. The connecting element according to claim 3, wherein the material of the connecting element is a copper/nickel/silicon alloy.

10. The connecting element according to claim 9, wherein the material of the connecting element is $CuNi_3Si$.

11. The connecting element according to claim 1, further comprising a covering made of copper.

12. The connecting element according to claim 1, further comprising a formed-on disc on the connecting element, the disc increasing a contact surface by at least 50%.

13. A current conductor arrangement with
    a) a first current-conducting component,
    b) a second current-conducting component, and
    c) a connecting element according to claim 1 which connects the first current-conducting component to the second current-conducting component.

14. The current conductor arrangement according to claim 13, wherein at least one of the first current-conducting component and the second current-conducting component is a conductor bar.

15. The current conductor arrangement according to claim 13, wherein at least one of the first current-conducting component and the second current-conducting component is a member selected from the group consisting of:
    a) a cable lug,
    b) an automotive body sheet,
    c) a hull of a boat,
    d) a conductor bar,
    e) a resistor, and
    f) a mass point.

16. A production method for producing the connecting element according to claim 1.

17. The production method according to claim 16, further comprising the following steps:
    a) producing a rolled wire from a material,
    b) solution heat treatment of the rolled wire,
    c) drawing the rolled wire to a specified nominal diameter.

18. The production method according to claim 17, further comprising removing an oxide layer on the rolled wire after the solution heat treatment of the rolled wire and prior to the drawing of the rolled wire.

19. The production method according to claim 17, wherein the production of the rolled wire comprises the following steps:
    a) melting the material in a vacuum furnace and then
    b) hot-rolling the material to form the rolled wire.

20. The production method according to one of claim 17, wherein the solution heat treatment of the rolled wire comprises the following steps:
    a) heating the rolled wire, and
    b) quenching the rolled wire.

21. The production method according to claim 20, wherein the rolled wire is heated to a temperature of +800-1200° C. for a duration of 5-15 minutes before quenching.

22. The production method according to claim 17, further comprising the following sequential steps:
    a) precipitation hardening the rolled wire, and
    b) forming connecting elements from the precipitation-hardened rolled wire.

23. The production method according to claim 22, wherein the precipitation hardening takes place at a temperature of +300-600° C. for a period of 4-16 hours.

24. The production method according to claim 22, wherein the precipitation hardening of the rolled wire takes place after the solution heat treatment and after the removal of the oxide layer.

25. The production method according to claim 22, wherein the precipitation hardening of the rolled wire takes place after the solution heat treatment and prior to the removal of the oxide layer.

26. The production method according to claim 17, further comprising the following sequential steps:
    a) forming connecting elements from the rolled wire prior to the precipitation hardening, and
    b) precipitation hardening the formed connecting elements.

27. The production method according to claim 26, wherein the precipitation hardening takes place at a temperature of +300-600° C. for a period of 4-16 hours.

28. The production method according to claim 16, further comprising the following steps:
    a) making available a copper/magnesium alloy,
    b) first cold forming of the copper/magnesium alloy to form a semi-finished product, and
    c) cold forming of the copper/magnesium alloy to form connecting elements.

29. The production method according to claim 28, wherein the copper/magnesium alloy comprises a mass percentage of magnesium of 0.1%-0.5%.

30. The production method according to claim 16, further comprising the following steps:
    a) making available a composite material made from a copper/niobium alloy with a copper sheath,
    b) drawing the composite material, and
    c) forming connecting elements from the composite material.

31. The production method according to claim 30, wherein the copper/niobium alloy comprises a mass percentage of niobium of 5%-30%.

* * * * *